US006433989B1

(12) United States Patent
Hinrichsen et al.

(10) Patent No.: US 6,433,989 B1
(45) Date of Patent: Aug. 13, 2002

(54) OVERVOLTAGE PROTECTOR FOR HIGH OR MEDIUM VOLTAGE

(75) Inventors: Volker Hinrichsen; Matthias Schubert, both of Berlin; Christian Korden, München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/462,151

(22) PCT Filed: Jun. 30, 1998

(86) PCT No.: PCT/DE98/01858

§ 371 (c)(1), (2), (4) Date: May 1, 2000

(87) PCT Pub. No.: WO99/01877

PCT Pub. Date: Jan. 14, 1999

(30) Foreign Application Priority Data

Jun. 30, 1997 (DE) ........................................ 197 28 961

(51) Int. Cl.$^{7}$ ................................................ H02H 1/00

(52) U.S. Cl. ....................................... 361/127; 361/118

(58) Field of Search ................................ 361/117, 118, 361/127, 128, 126, 130, 131; 324/72, 102, 104, 105; 340/635, 638

(56) References Cited

U.S. PATENT DOCUMENTS 4,249,418 A 2/1981 Ebata ....................... 73/339 A 4,495,459 A 1/1985 Kresge ....................... 361/127

FOREIGN PATENT DOCUMENTS

| | | | |
|---|---|---|---|
| DE | 42 00 076 | 8/1993 | G01S/13/74 |
| EP | 0 388 779 | 9/1990 | H02G/15/06 |
| EP | 0 549 432 | 6/1993 | H01C/7/12 |
| EP | 0 716 489 | 6/1996 | H02B/13/065 |

OTHER PUBLICATIONS

Patent Abstracts of Japan, JP 06 283315 A (NGK Insulators Ltd.) Oct. 7, 1994.

Patent Abstracts of Japan, vol. 015, No. 067 (P–1167), Feb. 18, 1991 & JP 02 290571 A (Meidensha Corp.), Nov. 30, 1990.

Gundlach Meinke, "Taschenbuch der Hochfrequenztechnik", 5$^{th}$ Edition, Springer Verlag, Berlin, Heidelberg, New York, Described in the Specification, No Date.

Tarek M. Habashy, "Input Impedance and Radiation Pattern of Cylindrical–Rectangular and Wraparound Microstrip Antennas", IEEE Transactions on Antennas and Propagation, vol. 38, No. 5, May 1990.

*Primary Examiner*—Ronald W. Leja

(74) *Attorney, Agent, or Firm*—Kenyon & Kenyon

(57) ABSTRACT

An overvoltage arrester for high or medium voltage is described which includes an arrester block arranged inside a sealed, gas-tight enclosure housing, a sensor, in particular a temperature sensor in the form of a surface wave sensor, is arranged inside the enclosure housing. The surface wave sensor is arranged in a housing that is designed as an antenna.

12 Claims, 6 Drawing Sheets

OVERVOLTAGE PROTECTOR FOR HIGH OR MEDIUM VOLTAGE

FIELD OF THE INVENTION

The present invention relates to an overvoltage arrester for high or medium voltage having an arrester block arranged inside a sealed, gas-tight enclosure housing.

BACKGROUND INFORMATION

An overvoltage arrester of this kind is described in heretofore, e.g., A2 European Patent Application No. 0 388 779 A2.

When an arrester having no spark gap is in its standby state, leakage current flows through the non-linear resistor elements, causing the body of the arrester to heat up slightly. As the arrester gets older, this leakage current may slowly increase, thus raising the average temperature of the arrester.

By measuring the temperature increase in the arrester having no spark gap, one can monitor the extent to which it has aged. Moreover, in arresters having a spark gap, by measuring the temperature one can draw certain conclusions about processes in the arrester. In addition, it is useful to obtain information about further operating variables of the arrester, these being determined inside the enclosure housing.

SUMMARY

An the object of the present invention is to provide an overvoltage arrester whose working condition and the extent to which it has aged, e.g., temperature, current, gas pressure or gas humidity, can be easily and conveniently monitored, and a method that allows one to reliably monitor the arrester and draw conclusions about its condition.

According to the present invention, this object is achieved as follows: A sensor, in particular a temperature sensor in the form of a surface wave sensor is arranged inside the enclosure housing and integrated into the arrester block.

A radio-queriable surface wave sensor is a passive, acoustic strip element to which a query signal in the form of an electromagnetic wave can be radiated from outside the arrester via an antenna, this signal being received via an antenna, radiated back in modified form based on certain physical values, e.g., the ambient temperature around the surface wave sensor, and picked up again by an antenna outside the enclosure housing. Thus, the measured value for the measured variable, in particular the temperature inside the enclosure housing of the overvoltage arrester, is made available for further processing to a query device outside the enclosure housing arranged, for example, at the foot of the arrester, further measures being unnecessary, and can, for example, be forwarded to a central data processing station via fiber optic cable, radio or other measuring line.

Furthermore, the signals radiated back by various different surface wave sensors may be encoded by the individual surface wave sensors, so that the signals of closely adjacent overvoltage arresters can easily be distinguished from one another and assigned accordingly. Moreover, the behavior of a surface wave sensor may be changed irreversibly if the sensor is temporarily overloaded. Thus, an overload that has occurred in the past can be determined from the altered behavior of the surface wave sensor. This feature can be used to record arrester overloads or total failures.

In normal cases, a discharge current flows for a very short time, so that a large amount of energy is converted into heat in the arrester block in a very short time. As a result, for a short time the arrester heats up significantly, which is reflected in a temperature jump that can be recorded by the surface wave sensor. The energy converted in the arrester can be calculated from the temperature difference associated with a temperature jump of this kind multiplied by the mean heat capacity of the arrester material and, respectively, from the appropriate calibration curve, and, respectively, the discharge processes can be counted so that the condition of the arrester can be documented or maintenance work performed.

To accomplish this, according to the method according to the present invention, if the temperature of the arrester block jumps suddenly, the electrical energy converted in the arrester may be determined from the temperature difference and the heat capacity.

The temperature values may be recorded on an ongoing basis by the surface wave sensor. In this case a stationary query unit radiates signals to the surface wave sensor on an ongoing basis and receives and evaluates the signals that are radiated back.

Alternatively, the individual surface wave sensors of a group of arresters may be queried using a portable query device only when maintenance is required, or periodically.

According to an advantageous embodiment of the overvoltage arrester according to the present invention, the surface wave sensor is arranged inside an at least partly metallic housing, whose walls or other components form an antenna and which is inserted between two discharge elements in the axial direction of the arrester block, or between a discharge element and a connector electrode.

Typically the metallic housing may be designed as a hollow cylinder having caps at both ends, these being made of, for example, aluminum. The metallic housing may then, for example, have at least one longitudinal slot which extends parallel to the longitudinal axis of the arrester body and functions as a slot antenna for receiving and radiating the signals exchanged between the query device and the surface wave sensor. To accomplish this, two connecting leads of the surface wave sensor, which is arranged inside the metallic housing, are conductively connected to this housing.

The metallic housing or a part thereof may also be designed as a patch antenna that includes two conductive layers having a dielectric layer arranged between them. Such slot antennas, patch antennas or micro-strip antennas of this kind are known heretofore according to, for example, Meinke, Grundlach: Taschenbuch der Hochfrequenztechnik (The High-frequency Technology Pocket Handbook), 5th edition, Springer Verlag, Berlin, Heidelberg, New York, and according to the journal article Input Impedance and Radiation Pattern of Cylindrical-Rectangular and Wraparound Microstrip Antennas, IEEE Transactions on Antennas and Propagation, Vol. 38, No. 5, May 1990.

Furthermore, it is useful if the housing conducts the discharge current if a discharge event occurs.

In this case, the current-carrying capacity of the metallic housing must be designed so that the housing can carry the discharge current without the housing or the surface wave sensor being damaged due to overheating.

To this end, the housing may be adhesively bonded to the directly adjacent discharge elements or held in contact with them by the load imparted by spring.

According to a further advantageous embodiment of the present invention, the housing is cylinder-shaped and fits into the outline of the arrester block.

Thanks to this design, high dielectric stability can be achieved, having no protruding edges that could facilitate discharge.

According to a further useful embodiment of the present invention, the surface wave sensor is attached to an inside wall of the housing that is directly adjacent to a discharge element.

As a result, the surface wave sensor takes on the temperature of the adjacent discharge element with no significant delay, so that the temperature indicated accurately reflects the instantaneous temperature of the arrester.

The surface wave sensor may be arranged outside the arrester block, in the gas area of the overvoltage arrester, so that the temperature of the overvoltage arrester or some other measured variable such as the gas density or the gas humidity of the filler gas can be monitored. However, the surface wave sensor must be favorably fitted into the antenna in dielectric terms, i.e., so that there is no significant field distortion of the electrical field.

DETAILED DESCRIPTION

Figure 1:
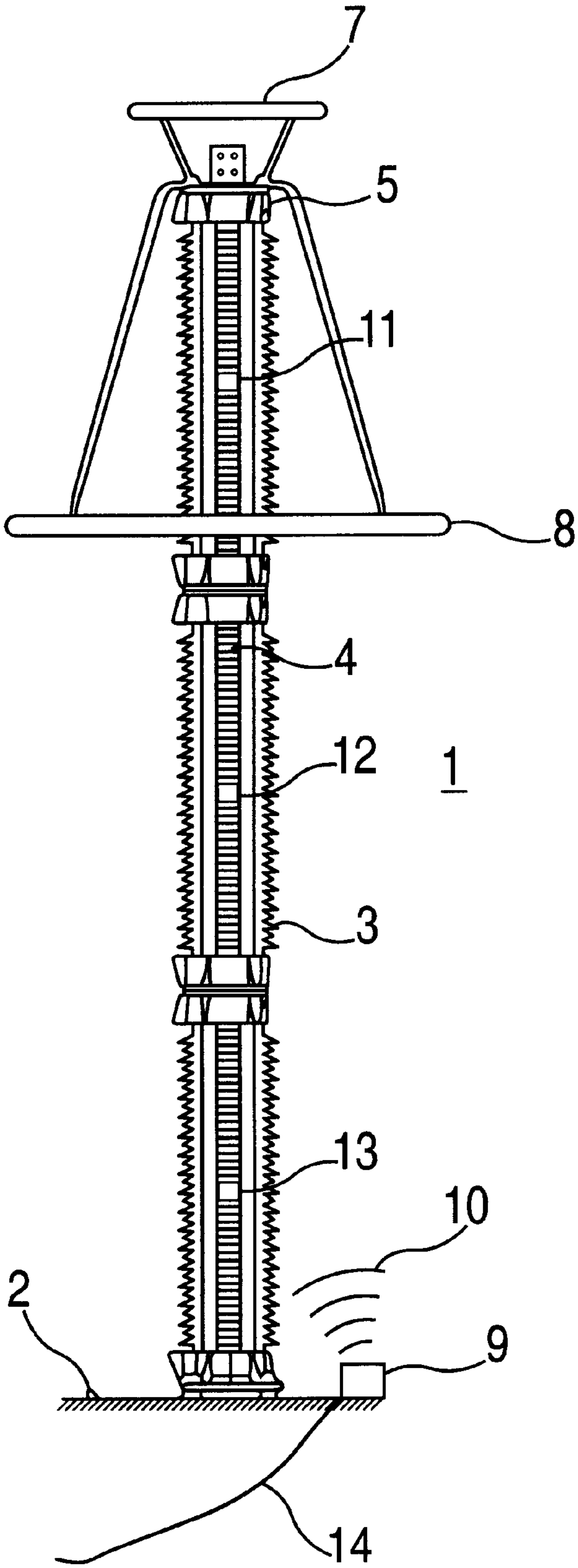
FIG. 1 schematically shows the design of an overvoltage arrester according to the present invention.

Overvoltage arrester 1 for high voltage is mounted on foundation 2. It includes, among other things, enclosure housing 3, inside which arrester block 4 is arranged, a gas-tight seal being formed, sealing armatures 5, 6 which seal enclosure housing 3 at both ends, and field control elements 7, 8. Arrester block 4 includes cylindrical discharge elements 15, 16, 17, 18 in the form of non-linear resistors, for example zinc oxide resistors, which are held together axially by the load imparted by a spring, or conductively adhesive-bonded, or held together by other means. The high-voltage connection is provided at armature 5, while the ground is connected to armature 6.

Three elements 11, 12, 13 are shown in black in the arrester block, each of these representing housing 18 of a surface wave sensor 19. At the foot of overvoltage arrester 1, query unit 9 is shown, which radiates high-frequency electromagnetic waves via an antenna, the wavefronts being shown symbolically as 10. These waves are picked up by the antennas of the surface wave sensors in housings 11, 12, 13 and, after passing through the surface wave sensor in question, and after the signal in question has changed correspondingly based on the measured value detected, e.g., the temperature, are radiated back to query unit 9.

Inside query unit 9, the local measured value determined by a given surface wave sensor, in particular the temperature value, is determined from the signals radiated back and stored. The values can be forwarded to a monitoring station via measuring line 14.

By inserting temperature sensors into arrester block 4, the temperature of the arrester block can be measured at individual points. If the quiescent current of the arrester increases due to aging, the arrester gradually heats up, and this can be recorded. If it heats up in a non-uniform manner at a given local point, this means specific discharge elements have aged prematurely.

If a discharge event occurs, a very large amount of electrical energy is converted to heat in a very short time, and can only be transferred outwards to enclosure housing 3 via the insulating gas in enclosure housing 3 in a delayed manner. The short-term temperature jump, which can be recorded using the surface wave sensors, provides information about the amount of energy converted and thus about the load to which the arrester is subject.

Figure 2:
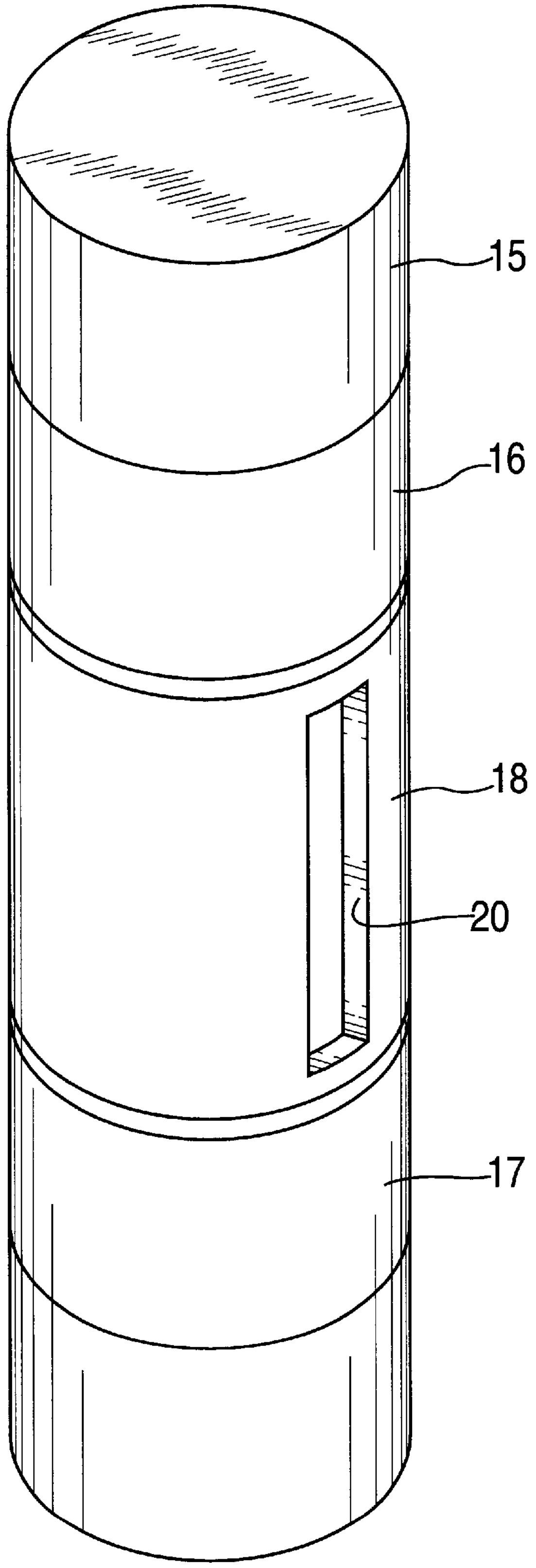
FIG. 2 schematically shows the design of an arrester block having a metallic housing inserted into it.
Figure 3:
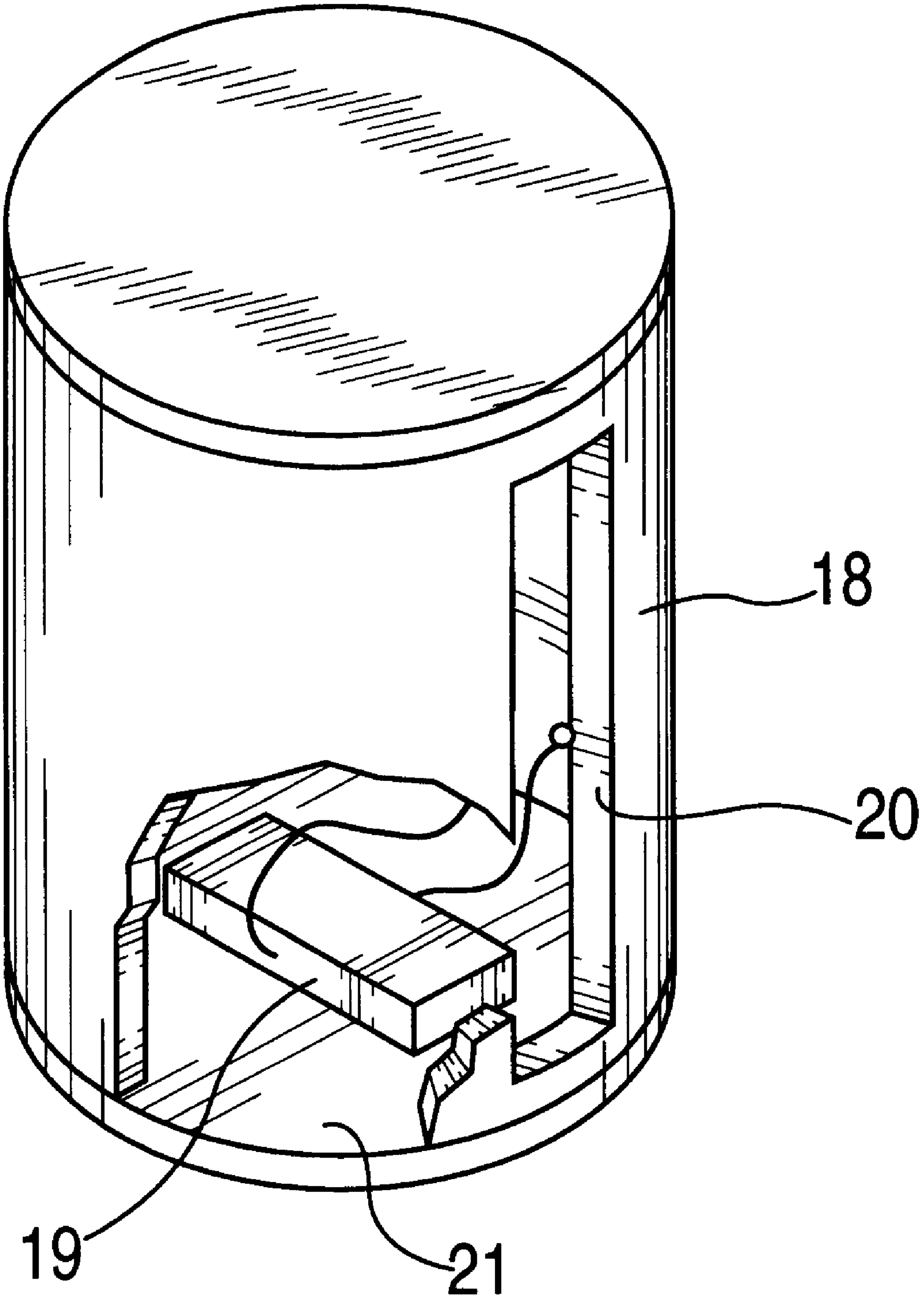
FIG. 3 schematically shows the design of the metallic housing having the surface wave sensor.

In FIG. 2, a detail of a part of arrester block 4 having discharge elements 15, 16, 17, 18, is schematically shown. Housing 18 of surface wave sensor 19 is arranged between discharge elements 16, 17. In housing 18, longitudinal slot 20 is provided, whose longitudinal direction extends parallel to the axis of arrester block 4. This slot 20 functions as an antenna for receiving and radiating back the query signals from query unit 9.

Housing 18 is made of, for example, aluminum or steel and is so thick-walled that it conducts the discharge current from discharge element 16 to discharge element 17 without becoming thermally overloaded. Surface wave sensor 19 is conductively connected via its connecting leads to two different points on housing 18.

Figure 4:
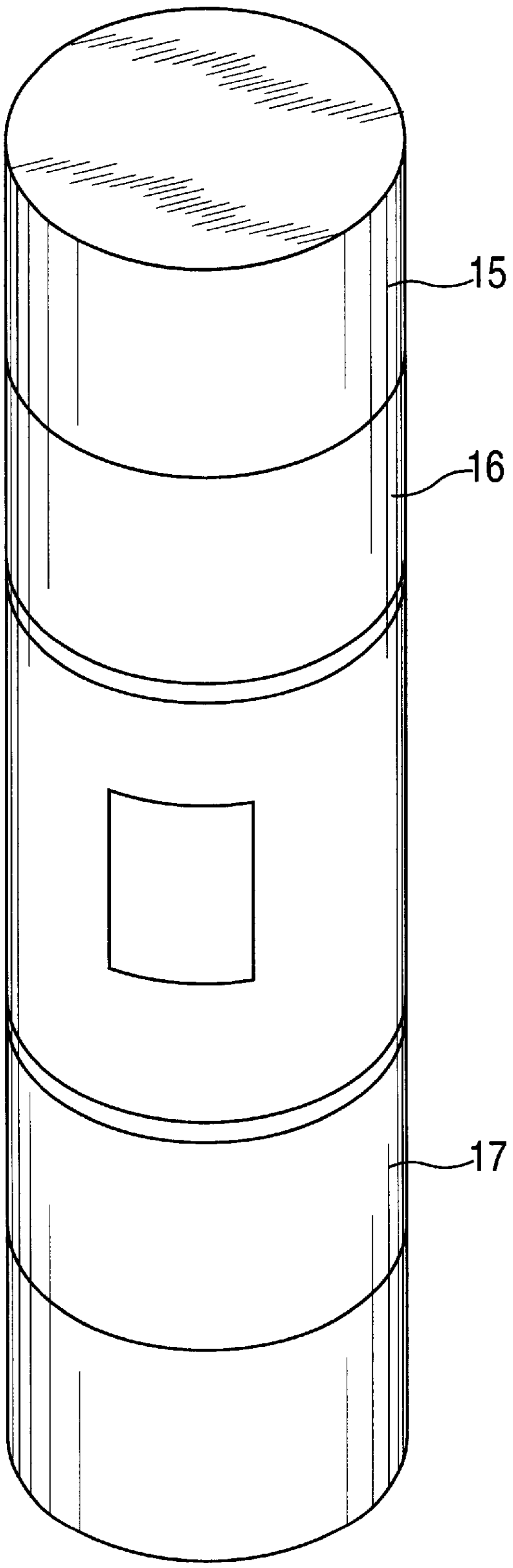
FIG. 4 schematically shows a housing having a microstrip antenna.

As shown in FIG. 4, may be provided a wraparound patch or patch antenna of any kind on housing 18 or integrated into the outer wall thereof which is then conductively connected to surface wave sensor 19 and used to radiate or receive the signals.

Figure 5:
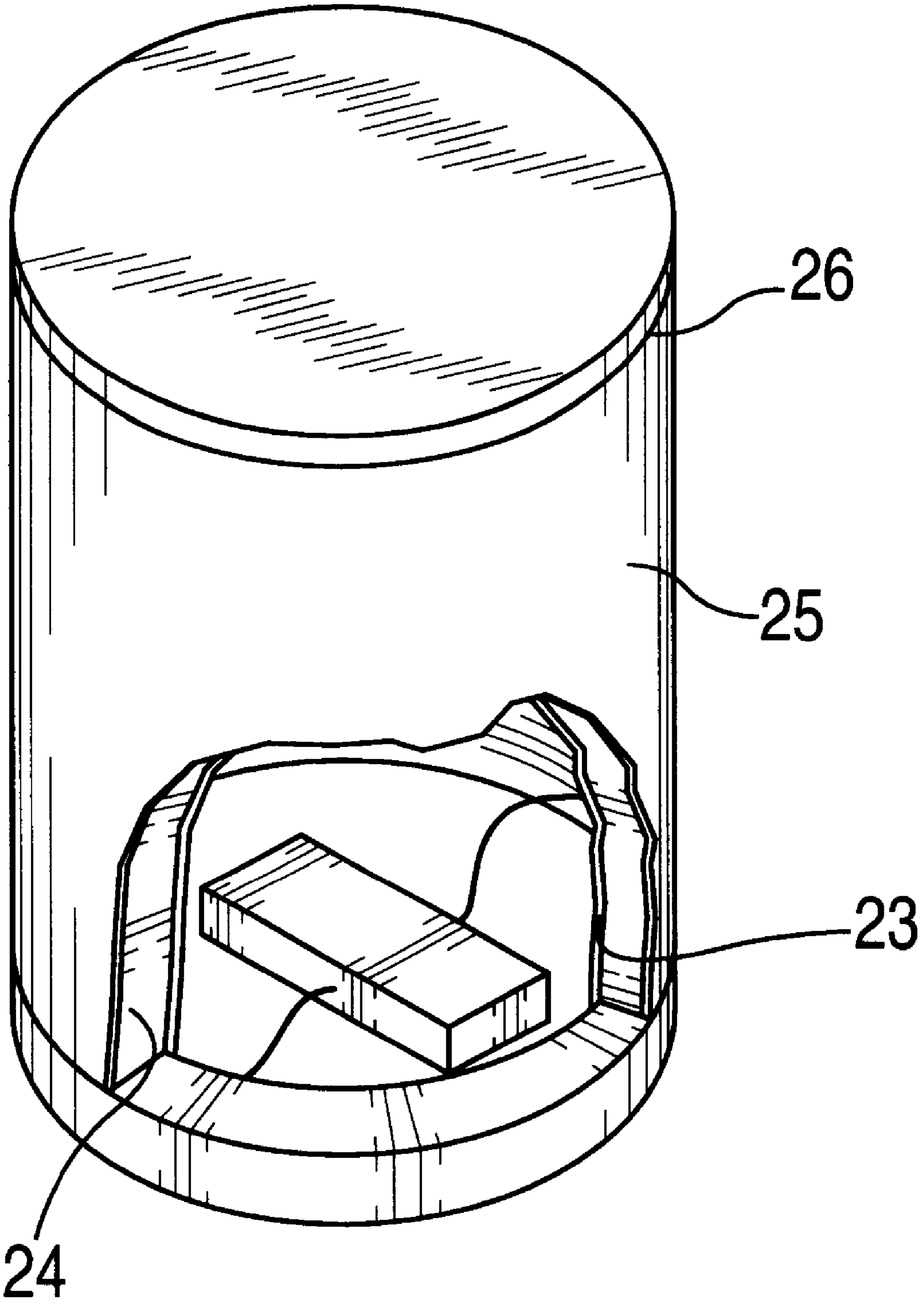
FIG. 5 schematically shows a housing having a housing wall made up by layers.

Alternatively, as shown in FIG. 5, at least part of the cylindrical wall of housing 18 may be designed as a body that includes two conductive layers having a dielectric layer arranged between them, so that this arrangement can also be used as an antenna.

In this case, inner layer 23 is solid and metallic and carries the discharge current. Dielectric 24, e.g., PTFE, is applied to this layer, this being covered on the outside by conductive layer 25. The conductive layer is conductively connected to the solid metallic layer at one end 26 of the housing only.

Figure 6:
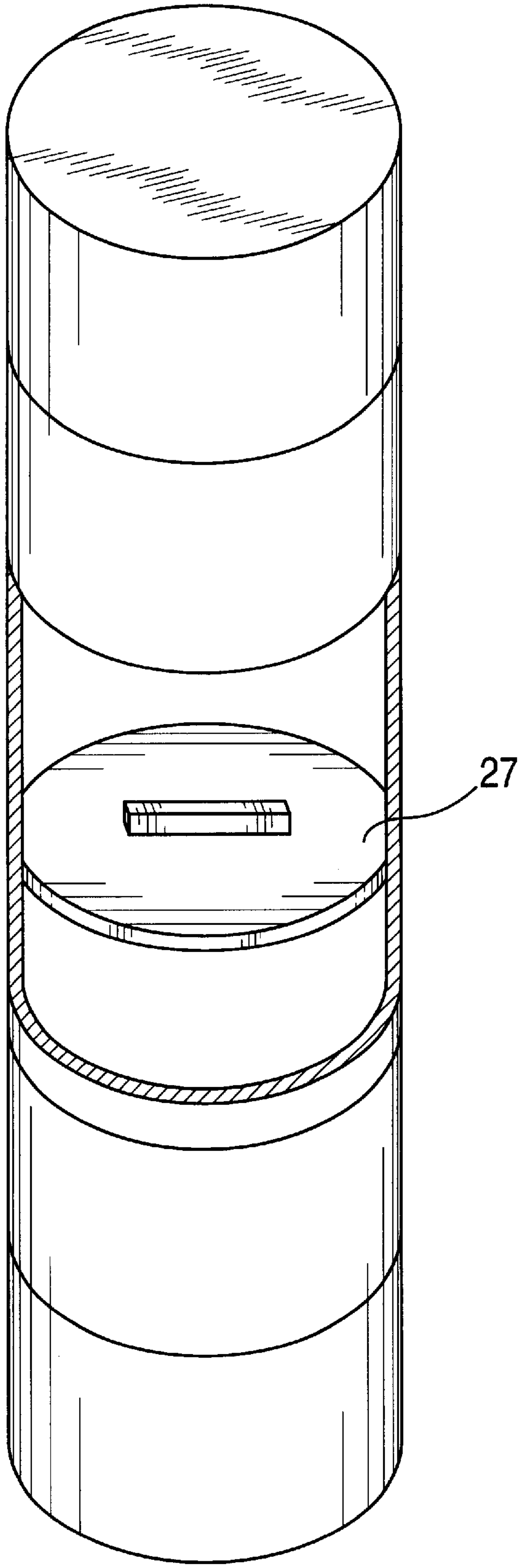
FIG. 6 schematically shows a housing having a partition wall that is designed as a slot antenna.

As shown in FIG. 6, partition wall 27 of the housing may be designed as a component thereof in the form of an antenna, e.g., a slot antenna.

The housing may also be designed as a cage that includes electrically conductive bars that extend parallel to the longitudinal axis of the arrester block.

What is claimed is:

1. An overvoltage arrester for high or medium voltage, comprising:

a sealed, gas-tight enclosure housing;

an arrester block arranged inside the housing; and a surface wave sensor arranged inside the housing and integrated into the arrester block.

2. The overvoltage arrester according to claim 1, wherein the surface wave sensor is arranged in an at least partially metallic housing, the at least partially metallic housing being inserted between a first discharge element and a second discharge element.

3. The overvoltage arrester according to claim 2, wherein the at least partially metallic housing conducts a discharge current when a discharge event occurs.

4. The overvoltage arrester according to claim 2, wherein the at least partially metallic housing is cylinder-shaped and fits into an outline of the arrester block.

5. The overvoltage arrester according to claim 2, wherein the wave sensor is attached to one of: i) an inside wall, and ii) a side wall, of the at least partially metallic housing, the one of the inside wall and the side wall being directly adjacent to first discharge element.

6. The overvoltage arrester according to claim 1, wherein the surface wave sensor is arranged in an at least partially metallic housing, the at least partially metallic housing being arranged between a first discharge element and a connector electrode.

7. The overvoltage arrester according to claim 1, wherein the surface wave sensor is arranged in an at least partially metallic housing.

8. The overvoltage arrester according to claim 7, wherein walls of the at least partially metallic housing form at least a portion of an antenna.

9. A method for monitoring an overvoltage arrester for high or medium voltage, comprising:

measuring a temperature inside an enclosure housing of the overvoltage arrester using a surface wave sensor to obtain measured values;

transmitting the measured values outward via an antenna; and if the temperature of an arrester block of the overvoltage arrester changes suddenly, determining electrical energy converted in the overvoltage arrester using the temperature change and a heat capacity.

10. An overvoltage arrester for high or medium voltage, comprising:

a sealed, gas-tight enclosure housing;

an arrester block arranged inside the housing and including at least two discharge elements; and a surface wave sensor arranged inside the housing and inserted between two of the at least two discharge elements of the arrester block.

11. The overvoltage arrester according to claim 10, wherein the two of the at last two discharge elements are cylindrical, non-linear resistors.

12. An overvoltage arrester for high or medium voltage, comprising:

a sealed, gas-tight enclosure housing;

an arrester block arranged inside the housing; and a surface wave sensor arranged inside the housing and inserted into the arrester block.

* * * * *